US012766825B2

(12) United States Patent
Agergaard

(10) Patent No.: US 12,766,825 B2
(45) Date of Patent: Oct. 20, 2026

(54) CHAMBERED DOCTOR-BLADE SEAL ASSEMBLY, DOCTOR-BLADE CHAMBER SEAL, AND METHOD FOR SAME

(71) Applicant: Agergaard Graphic Supplies GmbH, Celle (DE)

(72) Inventor: Ole Christian Agergaard, Celle (DE)

(73) Assignee: Agergaard Graphic Supplies GmbH, Celle (DE)

(*) Notice: Subject to any disclaimer, the term of this patent is extended or adjusted under 35 U.S.C. 154(b) by 64 days.

(21) Appl. No.: 18/879,450

(22) PCT Filed: Aug. 8, 2023

(86) PCT No.: PCT/DE2023/100582
§ 371 (c)(1),
(2) Date: Dec. 27, 2024

(87) PCT Pub. No.: WO2024/046526
PCT Pub. Date: Mar. 7, 2024

(65) Prior Publication Data

US 2026/0257468 A1 Sep. 3, 2026

(30) Foreign Application Priority Data

Aug. 31, 2022 (DE) ..................... 20 2022 104 909.2

(51) Int. Cl.
*B41F 31/02* (2006.01)
*B41F 5/24* (2006.01)
*B41F 9/10* (2006.01)

(52) U.S. Cl.
CPC .............. *B41F 9/1063* (2013.01); *B41F 5/24* (2013.01); *B41F 31/027* (2013.01)

(58) Field of Classification Search
CPC ......... B41F 9/1063; B41F 5/24; B41F 31/027
See application file for complete search history.

(56) References Cited

U.S. PATENT DOCUMENTS 5,927,199 A * 7/1999 Achelpohl ............ B41F 31/027 101/366
6,553,195 B2 * 4/2003 Korfhage ........... G03G 21/0011 399/350

(Continued)

FOREIGN PATENT DOCUMENTS

DE 4414681 A1 12/1994
DE 19631301 A1 2/1998

(Continued)

OTHER PUBLICATIONS

International Search Report mailed on Jan. 17, 2024, in International Application No. PCT/DE2023/100582.

*Primary Examiner* — David H Banh
(74) *Attorney, Agent, or Firm* — Patent Central LLC; Stephan A. Pendorf

(57) ABSTRACT

A chambered doctor-blade seal assembly for a chambered doctor-blade system for supplying printing ink to a printing system having anilox rolls, with a doctor-blade chamber, which extends longitudinally over the printing width and forms, together with a chamber base and two oppositely located lateral projections, a cavity filled with the printing ink. A chamber doctor blade end seal arrangement is provided in which a replaceable chamber doctor blade end seal can be securely fixed without tools and without removing the doctor blades, while at the same time ensuring that the doctor blade chamber is easy to clean.

12 Claims, 5 Drawing Sheets

(56) References Cited

U.S. PATENT DOCUMENTS

Figure 3:
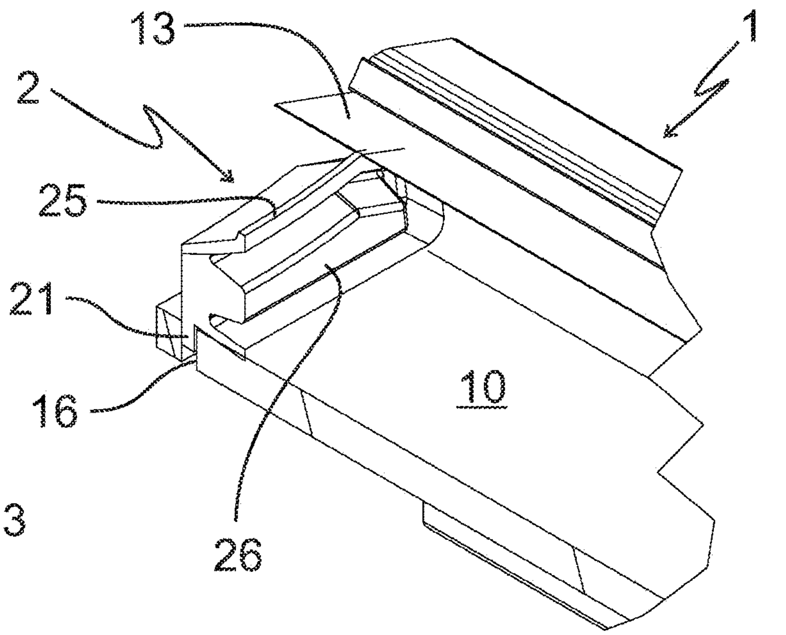

| | | | | |
|---|---|---|---|---|
| 6,629,496 | B1 * | 10/2003 | Boose | B41F 31/027 101/366 |
| 8,925,455 | B2 | 1/2015 | Foley | |
| 9,085,131 | B1 | 7/2015 | Van Denend | |
| 2003/0059227 | A1 * | 3/2003 | Korfhage | G03G 21/0011 399/102 |
| 2009/0000499 | A1 | 1/2009 | Boose et al. | |
| 2009/0154951 | A1 * | 6/2009 | Askren | G03G 15/0817 399/103 |
| 2009/0266256 | A1 * | 10/2009 | Rothlein | B41F 31/027 101/366 |
| 2014/0230672 | A1 * | 8/2014 | Andersson | B41F 5/24 101/363 |
| 2016/0185104 | A1 * | 6/2016 | Nadachi | B41F 35/00 101/483 |

FOREIGN PATENT DOCUMENTS

| | | | |
|---|---|---|---|
| DE | 202009013643 | U1 | 3/2011 |
| WO | 2013104366 | A1 | 7/2013 |

* cited by examiner

Fig. 1
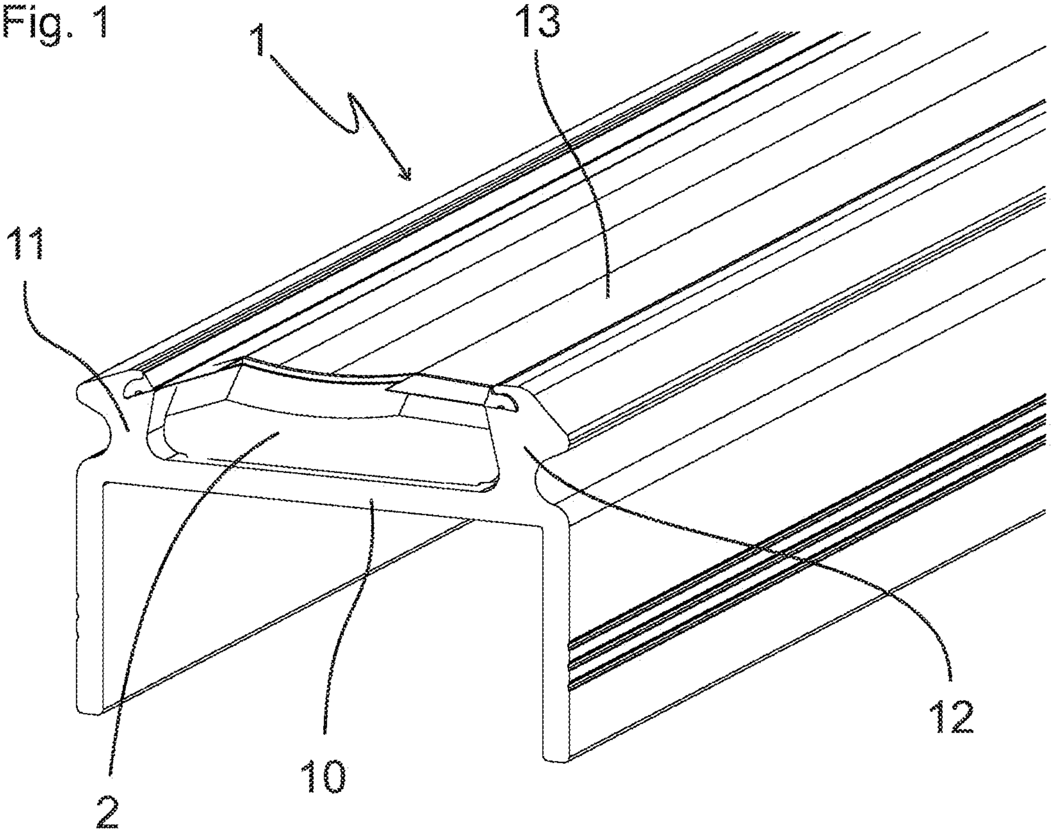
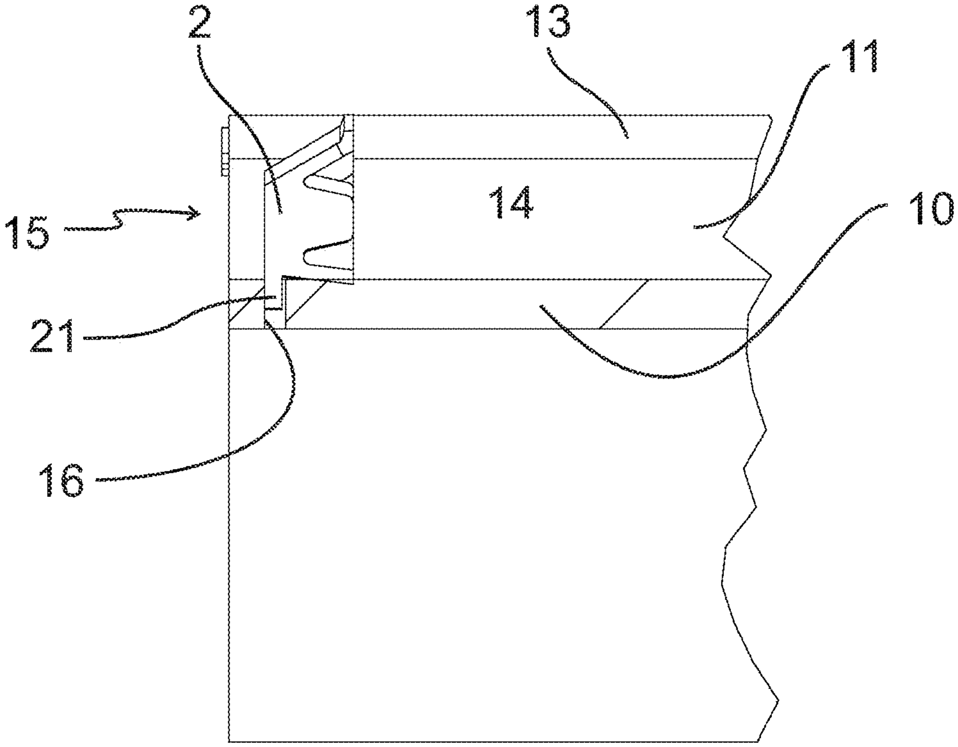
Fig. 2

Fig. 6
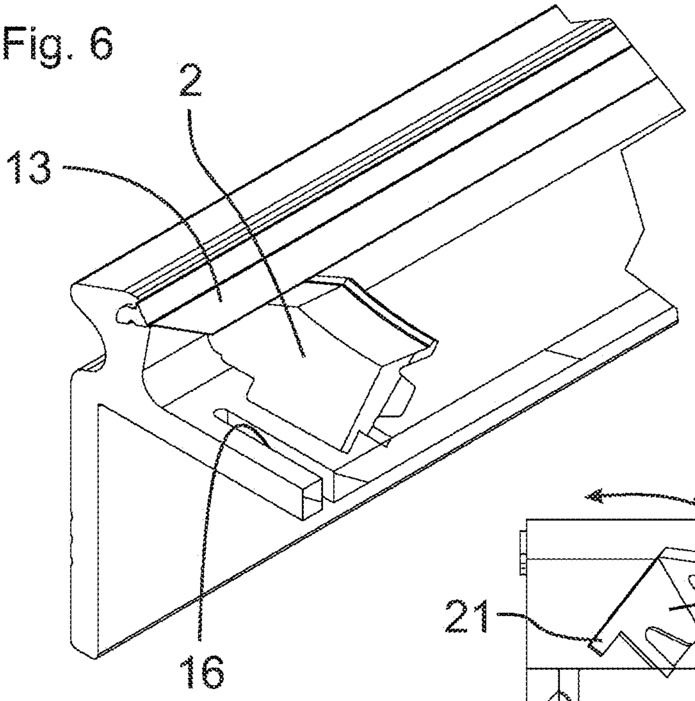
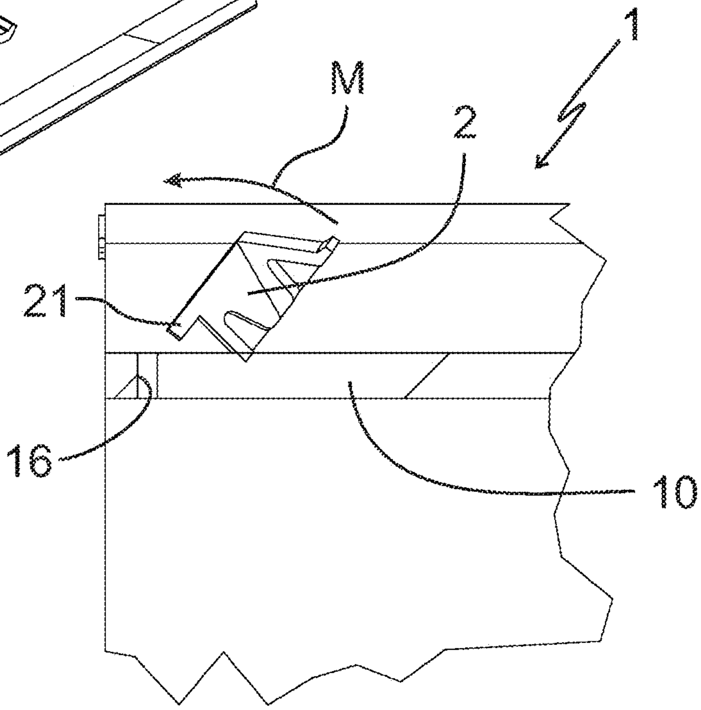
Fig. 7
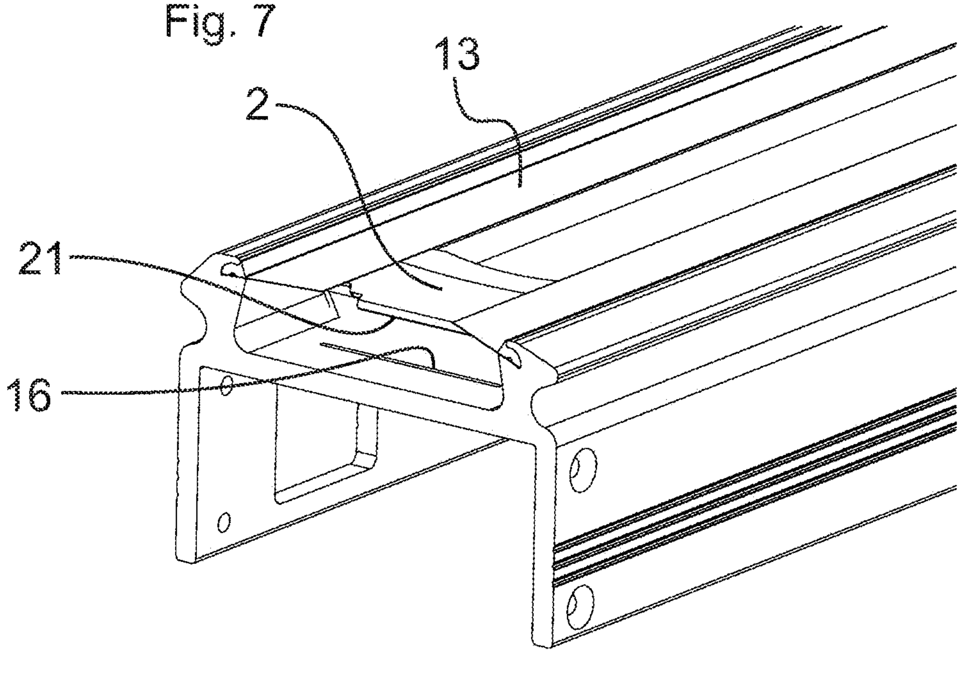
Fig. 8

Fig. 12
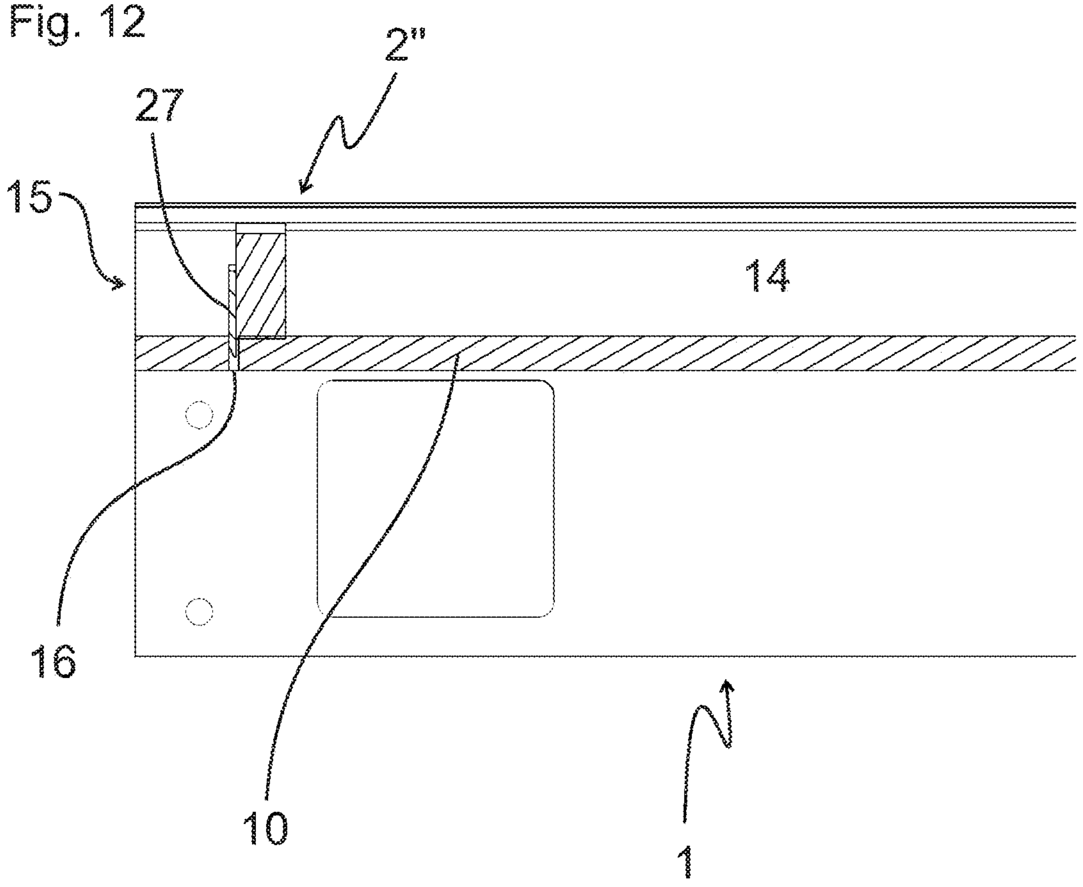
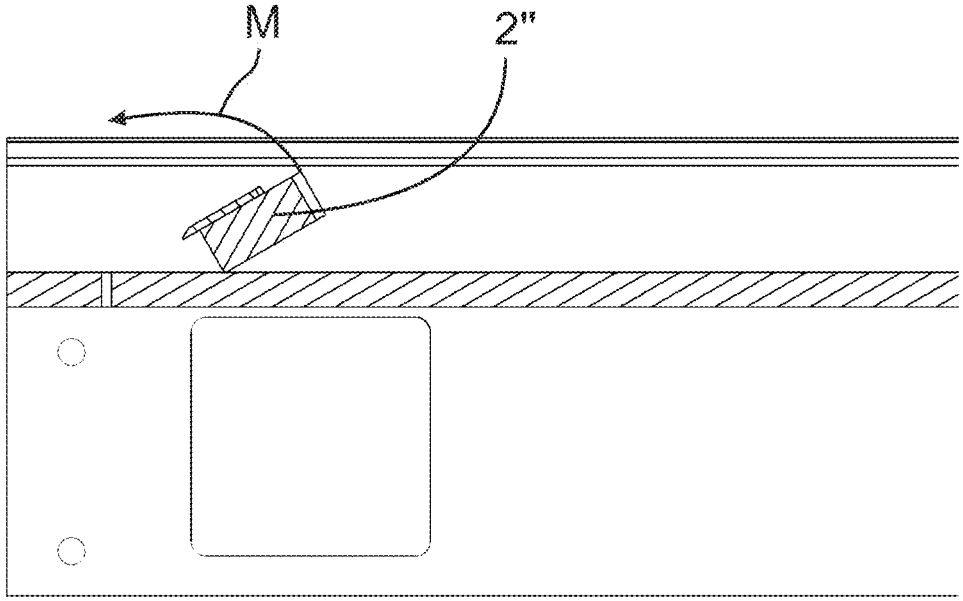
Fig. 13

CHAMBERED DOCTOR-BLADE SEAL ASSEMBLY, DOCTOR-BLADE CHAMBER SEAL, AND METHOD FOR SAME

The invention relates to a chamber doctor blade end seal arrangement for a chamber doctor blade system for supplying printing ink to a printing system with an anilox roller, in particular for flexographic printing and coating processes, with a doctor blade chamber which extends longitudinally over the printing width, forms a cavity filled with the printing ink with a chamber base and two opposing side webs and has doctor blades on the side webs, and with chamber doctor blade end seals which seals the cavity at both end faces of the doctor blade chamber, which extends longitudinally over the printing width, from the anilox roller lying thereabove, wherein the chamber doctor blade end seal is formed from an elastic seal body, the shape of which corresponds to the free cross-section at the end face of the chamber. The invention also relates to a chamber doctor blade end seal for this chamber doctor blade end seal arrangement and a method for inserting this chamber doctor blade end seal.

Chamber doctor blade systems are known for metering the amount of ink for printing systems, in particular for flexographic printing-processes, but also for coatings. The ink is fed to the printing system via a doctor blade chamber, whereby the chamber extends over the entire working width of the printing unit and rests against an anilox roller, which thus picks up ink from the doctor blade chamber during rotation, whereby excess ink is doctored off the anilox roller via the doctor blade. End seals are inserted into the short ends of the elongated chambers to seal the cavity from the open end and the anilox roller above.

WO 2013/104366 A1 discloses a printing unit with a doctor blade chamber and an anilox roller rotating therein or a suitable chamber doctor blade end seal. The chamber doctor blade end seal has a sealing surface which faces the chamber base of the chamber, with the seal body extending over the end face of the doctor chamber. The seal according to WO 2013/104366 A1 has a two-legged cross-section and has a first leg which forms an inclined surface to the interior (cavity) of the doctor blade chamber to which ink is applied. The preferred angle between this inclined surface and the lower sealing surface to the chamber floor should be 40° to 60°. Furthermore, the end seal has a stiffer support rail at its upper end, which forms the seal with an elastomer edge over a concave shape to the anilox roller.

In the state of the art, these chamber doctor blade end seals are fixed in the chamber doctor blade system in different ways, whereby tools are usually required to change the seals or the sensitive doctor blades have to be removed. In addition, the known sealing systems have complicated fixing details, resulting in many corners and edges to which ink can adhere, making cleaning more difficult.

DE 44 14 681 A1 describes a doctor blade chamber in which a leaf spring is accommodated in a gap between a chamber body and a holder attached to the end face of the latter. Here, too, there is a separate holder for the chamber doctor blade end seal, which is attached to the outside of the end faces of the chamber by means of screws.

DE 196 31 301 A1 describes an doctor blade chamber for a printing press, with particular attention being paid to sealing the front ends of the ink chamber doctor blade against unwanted ink leakage. A two-part design consisting of an inner, flexible material and an outer, rigid material is specified, with the assembly again comprising fastening and clamping screws.

DE 20 2009 013 643 U1 describes a two-part sealing element for sealing the end faces of doctor blade chambers, in particular on flexographic printing machines, which also provides for a design with two different materials, namely a soft material in contact with the ink roller and a firmer material underneath (i.e. radially away from the roller). The softer piece of material with the concave shaped inner part is equipped with a bar that fixes this softer piece of material in the firmer material so that it cannot slip. A groove is provided in the firmer material into which the web of the softer piece of material engages. No statements are made regarding the attachment of this two-part sealing element, in particular the firmer piece of material, to the end face of the doctor blade chamber.

Based on this standard of technology, the task of the invention is to provide a chamber doctor blade end seal arrangement in which the replaceable chamber doctor blade end seal can be securely fixed without tools and without removing the doctor blades, while at the same time ensuring that the doctor blade chamber is easy to clean.

This task is solved with a chamber doctor blade end seal arrangement according to claim 1, a chamber doctor blade end seal according to claim 9 and a method for inserting this chamber doctor blade end seal according to claim 12.

The fact that a groove is arranged in the chamber base on each end face essentially perpendicular to the longitudinal extension of the doctor blade chamber or parallel to the end face and that a tongue is formed on the seal body of the end seal, which engages in the groove when the chamber doctor blade end seal is inserted into the chamber as intended, ensures that the seal is securely fixed via the tongue and groove connection when the elastic chamber doctor blade end seal is inserted into the doctor blade chamber. As a groove only needs to be provided in the chamber base of a chamber, the cleanability of the chamber is hardly affected. The groove at the end face is arranged parallel to the plane of the chamber spanned by the end face and is therefore not directly exposed to ink. The linear support of the chamber doctor blade end seal via the tongue provided on it over the groove arranged essentially perpendicular to the longitudinal extension of the doctor blade chamber not only prevents the chamber doctor blade end seal from moving, but also from rotating undesirably. No tools are required for either the assembly or disassembly of the chamber doctor blade end seal in/from the chamber. Assembly can be carried out manually, as the chamber doctor blade end seal is inserted into the cavity between the two opposing doctor blades, rotated through 90° and then pushed outwards towards the end face and pivoted into its intended position, with the tongue of the chamber doctor blade end seal engaging in the groove in the chamber base. When dismantling, proceed in exactly the reverse order.

If the tongue on the chamber doctor blade end seal is made up of two or more tongue sections, the support of the chamber doctor blade end seal in the groove in the chamber base of the chamber can be distributed over two or more separate tongue sections. This ensures that the chamber doctor blade end seal remains correctly positioned and cannot twist.

For this purpose, the groove in the chamber base can preferably be formed from two or more groove sections. The tongue sections, which are arranged separately from each other, then engage in correspondingly assigned groove sections in the chamber base of the chamber.

The fact that the chamber doctor blade end seal is formed in two parts from the elastic seal body and a seal holder part made of stiffer material, whereby the seal holder part has the tongue and/or tongue sections and connecting means for coupling to the seal body, the supporting effect of the chamber doctor blade end seal engaging in the groove can be increased to the extent that the material used for the seal holder part is stiffer than the more elastic material for the seal body.

Preferably, the connecting means are orthogonally protruding pins on the flat seal holder part, which can be inserted into precisely fitting holes in the seal body.

The fact that the chamber doctor blade end seal has a cup shape with a closed cup base, a cup opening spanned by a cup wall and a sealing edge running around the cup opening, whereby when the chamber doctor blade end seal is inserted into the chamber as intended, the cup opening is oriented towards the cavity filled with the printing ink, the malleability and adaptability of the chamber doctor blade end seal and in particular of its circumferential sealing edge is increased, so that undesired ink leakage at the end face of the doctor blade chamber is largely avoided. In addition, the insertion and removal of the chamber doctor blade end seal into the doctor blade chamber is simplified in the case of the cup-shaped design. In addition, ink from the chamber entering the cup opening under slight overpressure increases the sealing effect, as the cup migration and in particular the sealing edge is pressed against the doctor blade chamber or against the anilox roller in accordance with the slight overpressure, thus supporting the snugging of the circumferential sealing edge against the chamber base, the side webs, the doctor blades and the anilox roller.

In a further embodiment, the cup wall has a wall thickness that decreases from the cup base to the sealing edge. This further improves the ability of the chamber doctor blade end seal to be pressed onto the doctor blade chamber or anilox roller, which ensures a very reliable seal.

If a stiffening part in the form of a cuboid or trapezoid is formed on the cup base inside the cup opening, the chamber doctor blade end seal becomes more dimensionally stable due to the stiffening part, while at the same time maintaining the aforementioned high sealing effect on the circumferential sealing edge. It is also particularly easy to grip the chamber doctor blade end seal manually at the stiffening part and insert it into the chamber.

In addition to the chamber doctor blade seal arrangement, a chamber doctor blade end seal for this arrangement is also the subject of the utility model. Preferably, the chamber doctor blade end seal is made of an elastic and dimensionally stable rubber or plastic. Stiffer materials provide a high level of tightness with sufficient stability to extend the replacement intervals.

For high-speed printing systems, it is particularly preferable if the contact area of the chamber doctor blade end seal with the anilox roller, which rotates rapidly during printing, is coated with Teflon.

The process for inserting this chamber doctor blade end seal is characterized by the following steps: feeding the chamber doctor blade end seal to the elongated doctor blade chamber in the desired installation orientation, but rotated by 90° about an axis orthogonal to the chamber bottom, into the cavity between the two opposing doctor blades; rotating the chamber doctor blade end seal back by 90° about the orthogonal axis and thereby tilting the chamber doctor blade end seal by 20° to 60° from the plane of the end face inwards towards the cavity in the direction of the chamber bottom; displacing the chamber doctor blade end seal oriented in this way to align its protruding tongue with the groove arranged on the relevant end face in the chamber base; and tilting the chamber doctor blade end seal back by the 20° to 60° from the plane of the end face outwards with respect to the cavity in an orientation perpendicular to the chamber base, parallel to the plane of the end face, whereby the protruding tongue slides into the groove arranged in the chamber base and the chamber doctor blade end seal is anchored in the chamber sealing the cavity. This ensures very easy handling when inserting and of course also when removing (in reverse order of the process steps) the chamber doctor blade end seal from the chamber without the use of tools or even dismantling the doctor blades. During insertion, the elastic chamber doctor blade end seal slides with its tongue into the groove provided for this purpose in the chamber base virtually automatically when tilted back into the installation position and ensures precise and sealed positioning of the chamber doctor blade end seal.

Three embodiments of the invention are described in detail below with reference to the accompanying drawings.

Figure 4:
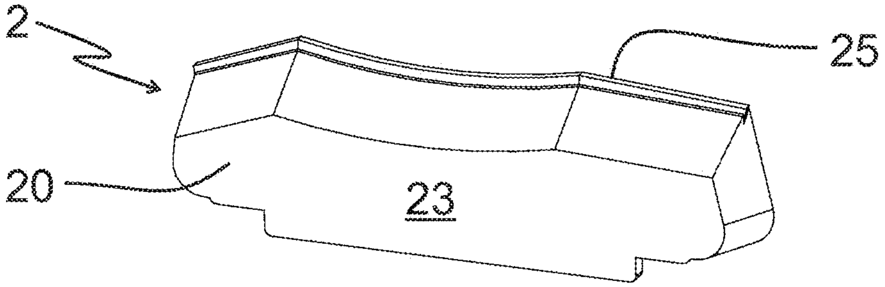
Figure 9:
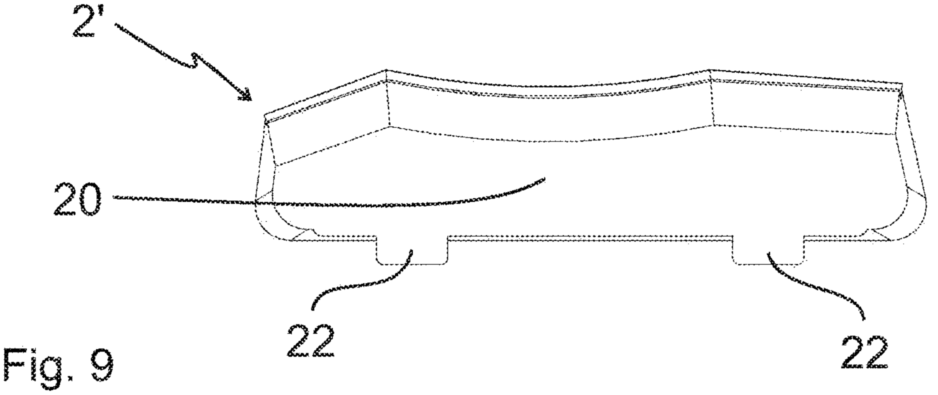
Figure 10:
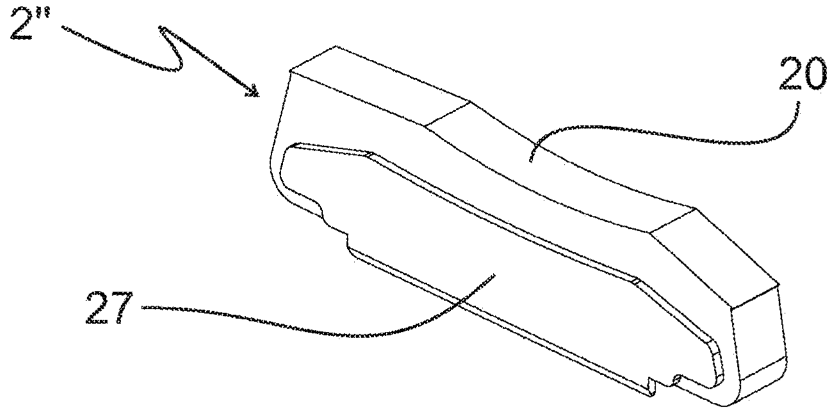
Figure 11:
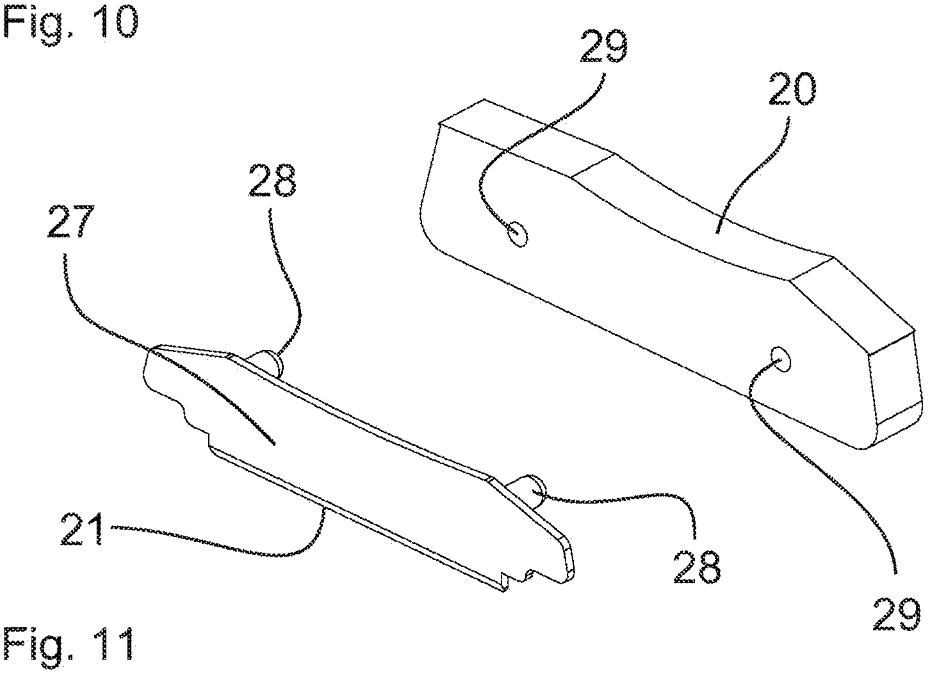

It shows:

FIG. 1 Partial spatial view of a chamber doctor blade end seal arrangement in a first embodiment, FIG. 2 the situation shown in FIG. 1 in longitudinal section, FIG. 3 the situation shown in FIGS. 1 and 2 in a partially sectioned spatial view, FIG. 4 spatial view of the chamber doctor blade end seal used in FIGS. 1 to 3, FIG. 5 further three-dimensional view of the seal shown in FIG. 4, FIG. 6 In spatial, partly sectional view of the situation when inserting the chamber doctor blade end seal, FIG. 7 The situation shown in FIG. 6 in longitudinal section, FIG. 8 Spatial view of the situation shown in FIGS. 6 and 7, FIG. 9 View of a chamber doctor blade end seal in a second embodiment, FIG. 10 Spatial view of a chamber doctor blade end seal in a third embodiment, FIG. 11 Exploded view of the chamber doctor blade end seal shown in FIG. 10, FIG. 12 Sectional view of a chamber doctor blade end seal arrangement with a chamber doctor blade end seal according to FIG. 9 and FIG. 13 The design shown in FIG. 12 when inserting the chamber doctor blade end seal.

FIG. 1 shows a three-dimensional view of a chamber doctor blade end seal arrangement with an inserted chamber doctor blade end seal 2. The doctor blade chamber 1 is designed here as an elongated extruded profile and has a chamber base 10, a first and second side web 11, 12, doctor blades 13 inserted at the side webs 11 and 12 and an end face 15 at each end. Only one end of the doctor blade chamber 1 is shown in FIG. 1. At the other end of the doctor blade chamber 1, the other end face 15 is also sealed with a chamber doctor blade end seal 2. In FIG. 1, an anilox roller belonging to the printing system runs above the doctor blade chamber 1 and closes off a cavity 14 at the top, which is formed by the chamber base 10, the two side webs 11, 12 with the doctor blades 13 and the chamber doctor blade end seals 2 inserted in the end faces 15, whereby the anilox roller is guided in contact along the doctor blades 13 and the concave shape of the chamber doctor blade end seals 2. The anilox roller is not shown here for the sake of clarity. The longitudinal section shown in FIG. 2 shows the anchoring of the chamber doctor blade end seal 2 in the chamber 1. A groove 16 is formed in the chamber base 10 of the chamber 1, in which a tongue 21 formed on the chamber doctor blade end seal 2 engages. In the embodiment example of the chamber doctor blade end seal 2 shown here, the seal body 20 is made of elastic material to which the tongue 21 is molded. The same situation is shown in FIG. 3 in a three-dimensional, partly sectional view, the details of which will be explained later.

Figure 5:
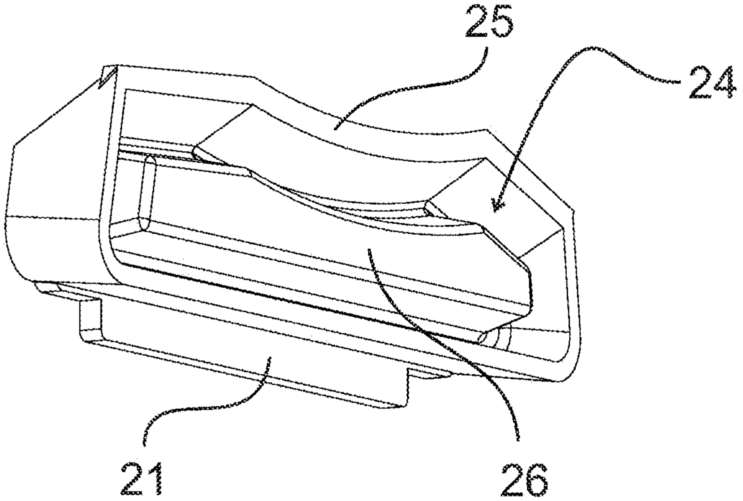

FIGS. 4 and 5 show in detail the chamber doctor blade end seal 2 according to the first embodiment example, which is also used in FIGS. 1 to 3. FIG. 4 shows a three-dimensional view of the side facing outwards when the chamber doctor blade end seal 2 is inserted into the doctor blade chamber 1 as intended. FIG. 5 shows the chamber doctor blade end seal 2 from the inside. The chamber doctor blade end seal 2 has a cup shape, whereby the closed cup base 23 is visible in FIG. 4. In FIG. 5, the cup-shaped chamber doctor blade end seal 2 can be seen from the cup opening 24. The cup wall running around the cup opening 24 forms the sealing edge 25 towards the opening, which, when the chamber doctor blade end seal 2 is inserted into the doctor blade chamber 1 as intended in the orientation shown in FIG. 5, rests at the bottom against the chamber base 10, on the right against the first side web 11, on the left against the second side web 12 and at the top laterally against the doctor blades 13 and centrally in the concave part against the anilox roller not shown. A stiffening part 26 projecting into the interior (cup opening 24) is formed from the cup base 23 inside the cup opening 24, as can also be seen in the sectional view of FIG. 2 and FIG. 3.

In the chamber doctor blade end seal 2 according to the first design example, the entire seal body 20, including the tongue 21 and also the stiffening part 26, is manufactured in one piece from the same elastic plastic or rubber material. This allows cost-effective production of this consumable material. The cup shape of the chamber doctor blade end seal 2 according to the first embodiment example provides the following additional properties:

The ink contained in the cavity 14, which is preferably under slight overpressure, presses into the cup opening 24 and causes the sealing wall with surrounding sealing edge 25 to be pressed against the doctor blade chamber 1, namely chamber base 10, side webs 11, 12, doctor blade 13 and the anilox roller not shown. This increases the sealing effect due to the slight overpressure of the printing ink. Any wear on the sealing edge 25 is also compensated for by a minimal further widening of the cup opening 24 and thus, in turn, a tight fit of the sealing edge 25 to the doctor blade chamber 1. The service life of the chamber doctor blade end seal 2 can be increased accordingly.

The stiffening part 26 projecting into the cup opening 24 in the cup base 23 simultaneously prevents undesired deformation of the entire chamber doctor blade end seal 2, in particular over the transverse extension parallel to the end face 15. In addition, the tongue 21 formed on the seal body 20 engages in the groove 16 in the chamber base 10 of the chamber 1, which reliably prevents further outward displacement of the chamber doctor blade end seal 2, i.e. in the direction of the drawing plane, for example to the left in FIG. 2.

In addition, the preferred cup shape of the chamber doctor blade end seal 2 according to the first embodiment example allows particularly easy assembly and disassembly of the chamber doctor blade end seal 2 in the doctor blade chamber 1. FIG. 6 shows the process of inserting the chamber doctor blade end seal 2 into the doctor blade chamber 1. Due to the cup shape, the sealing edge 25 can also be pressed slightly inwards as required when inserting the chamber doctor blade end seal 2, so that the chamber doctor blade end seal 2 can first be inserted at 90° into the chamber 1 between the doctor blades 13 to position it as intended and then rotated to the desired orientation essentially parallel to the end face 15, but still inclined, as shown in FIG. 6 and in particular in FIG. 7 shown in longitudinal section, then by shifting and folding open the chamber doctor blade seal 2 in the direction of arrow M and thus inserting the tongue 21 into the groove 16 in the chamber base 10. No tools are therefore required for this work. No tools are required to remove the chamber doctor blade end seal 2 from the chamber 1 either. Disassembly is carried out in the reverse order to that described for assembly.

In addition, the situation in FIG. 8 is shown in a three-dimensional view. This clearly shows that the chamber doctor blade end seal 2 between the two doctor blades 13 protruding from the side webs 11, 12 can be gripped by the fitter and inserted into the groove 16 arranged parallel to the end face 15 with its molded tongue 21 or removed in reverse order. It is also not necessary to remove the doctor blades 13 for this purpose.

In a second embodiment according to FIG. 9, the chamber doctor blade end seal 2' has a two-part tongue 21 in the form of two tongue sections 22, which can be inserted into the groove 16 of the doctor blade chamber 1, as shown in FIG. 6 or 8. Alternatively, the groove 16 in the doctor blade chamber 1 can also be formed from two groove sections corresponding to the tongue sections 22 of the associated chamber doctor blade end seal 2'. Furthermore, the two tongue sections 22 could also be very short in the form of protruding pins that engage in corresponding holes as very short groove sections in the chamber base 10.

In a further embodiment, the chamber doctor blade end seal 2" is formed from a seal body 20 made of elastic rubber or plastic, whereby a separate seal holder part 27 made of a stiffer material is provided, which can be connected via connecting means, in this case two pins 28 projecting orthogonally from the flat seal holder part 27, which can be inserted into associated, matching holes 29 in the seal body 20 (see FIGS. 10 and 11). The tongue 21, which can engage in the groove 16 in the chamber 1, is formed on the seal holder part 27.

This situation is shown in FIG. 12 in a longitudinal section. Here, too, the chamber doctor blade end seal 2" is inserted or removed without tools, as the chamber doctor blade end seal 2" can also be inserted into the doctor blade chamber 1 between the doctor blades 13, rotated by 90° and then pre-positioned at an angle to the position on the end face 15 near the groove 16 and then pivoted into the correct position in accordance with the assembly arrow M. Due to the elasticity of the seal body 20, an approximately cuboid component can also be moved into the correct position below the doctor blades 13, positioned and secured by pivoting the tongue 21 arranged on the seal holder part 27 into the groove 16 in the doctor blade chamber 1. Due to the stiffer seal holder part 27, which secures the elastic seal body 20 by inserting it into the groove 16, a high sealing effect can also be achieved in this design with easy assembly/disassembly at the same time.

LIST OF REFERENCE SYMBOLS

1 Doctor blade chamber
10 Chamber base
11 First side web

12 Second side web
13 Doctor blades
14 Cavity
15 End face of chamber
16 Groove
2,2',2" Chamber doctor blade end seal
20 Seal body
21 Tongue
22 Tongue section
23 Cup base
24 Cup opening
25 Sealing edge
26 Stiffening part
27 Seal holder part
28 Pins
29 Holes
M Mounting movement

The invention claimed is:

1. A chamber doctor blade end seal arrangement for a chamber doctor blade system for supplying printing ink to a printing system with an anilox roller, having a doctor blade chamber (1) which extends longitudinally over the printing width and which with a chamber base (10) and two opposing side webs (11,12) forms a cavity (14) filled with the printing ink and has doctor blades (13) on the side webs (11, 12), and with chamber doctor blade end seals (2, 2', 2") which seal the cavity (14) to the anilox roller lying thereabove on both end faces (15) of the doctor blade chamber (1) which extends longitudinally over the printing width, the chamber doctor blade end seal (2, 2', 2") being formed from an elastic seal body (20), the shape of which corresponds to the free cross-section on the end face (15) of the doctor blade chamber (1), wherein a groove (16) is arranged in the chamber base (10) on each of the end faces (15) essentially parallel to the end face (15) of the doctor blade chamber (1), and wherein a tongue (21) is formed on the seal, which tongue engages in the groove (16) when the chamber doctor blade end seal (2, 2', 2") is inserted into the doctor blade chamber (1) as intended.

2. The chamber doctor blade end seal arrangement according to claim 1, wherein the tongue (21) on the chamber doctor blade end seal (2') is formed from two or more tongue sections (22).

3. The chamber doctor blade end seal arrangement according to claim 2, wherein the groove (16) in the chamber base (10) is formed from two or more groove sections.

4. The chamber doctor blade end seal arrangement according to claim 1, wherein the chamber doctor blade end seal (2") is formed in two parts from the elastic seal body (20) and a seal holder part (27) made of stiffer material, the seal holder part (27) having the tongue (21) and/or tongue sections (22) and connecting means (28) for coupling to the seal body (20).

5. The chamber doctor blade end seal arrangement according to claim 4, wherein the connecting means (28) on the flat formed seal holder part (27) are orthogonally projecting pins (28) which can be inserted into precisely fitting holes (29) in the seal body (20).

6. The chamber doctor blade end seal arrangement according to claim 1, wherein the chamber doctor blade end seal (2) has a cup shape with a closed cup base (23), a cup opening (24) spanned by a cup wall and a sealing edge (25) running around the cup opening (24), the cup opening (24) being oriented towards the cavity (14) filled with the printing ink when the chamber doctor blade end seal (2) is inserted into the doctor blade chamber (1) as intended.

7. The chamber doctor blade end seal arrangement according to claim 6, wherein the cup wall has a wall thickness which decreases from the cup base (23) to the sealing edge (25).

8. The chamber doctor blade end seal arrangement according to claim 6, wherein a stiffening part (26) in the form of a cuboid or trapezoid is formed on the cup base (23) inside the cup opening (24).

9. A chamber doctor blade end seal (2,2',2") for a chamber doctor blade end seal arrangement according to claim 1.

10. The chamber doctor blade end seal (2, 2', 2") according to claim 9, wherein it is made of an elastic and dimensionally stable rubber or plastic.

11. The chamber doctor blade end seal (2, 2', 2") according to claim 9, wherein the contact area of the chamber doctor blade end seal (2, 2', 2") with the anilox roller, which rotates rapidly during printing, is coated with Teflon.

12. A method of inserting a chamber doctor blade end seal (2,2',2") to form a chamber doctor blade end seal assembly according to claim 1, comprising the steps of:

guiding the chamber doctor blade end seal (2, 2', 2") into the cavity (14) between the two opposing doctor blades (13) in the desired installation orientation, but rotated by 90° about an axis orthogonal to the chamber base (10), rotating the chamber doctor blade end seal (2, 2', 2") back by 90° around the orthogonal axis and thereby tilting the chamber doctor blade end seal (2, 2', 2") by 20° to 60° from the plane of the end face (15) inwards towards the cavity (14) in the direction of the chamber base (10), displacing the chamber doctor blade end seal (2, 2', 2") thus oriented to align its projecting tongue (21) with the groove (16) arranged on the relevant end face (15) in the chamber base (10), and tilting the chamber doctor blade end seal (2,2',2") back by 20° to 60° from the plane of the end face (15) outwards in relation to the cavity (14) in an orientation perpendicular to the chamber base (10), parallel to the plane of the end face (15), wherein the projecting tongue (21) slides into the groove (16) arranged in the chamber base (10) and the chamber doctor blade end seal (2, 2', 2") is anchored in the doctor blade chamber (1) so as to seal the cavity (14).

* * * * *